(12) United States Patent
Zurfluh

(10) Patent No.: US 8,177,929 B2
(45) Date of Patent: May 15, 2012

(54) METHOD OF MAKING AN EMBOSSED METAL GASKET

(75) Inventor: Thomas Zurfluh, Evanston, IL (US)

(73) Assignee: Federal-Mogul World Wide, Inc., Southfield, MI (US)

(*) Notice: Subject to any disclaimer, the term of this patent is extended or adjusted under 35 U.S.C. 154(b) by 126 days.

(21) Appl. No.: 12/726,591

(22) Filed: Mar. 18, 2010

(65) Prior Publication Data

US 2010/0170597 A1 Jul. 8, 2010

Related U.S. Application Data

(62) Division of application No. 11/773,200, filed on Jul. 3, 2007, now Pat. No. 7,708,842.

(60) Provisional application No. 60/822,897, filed on Aug. 18, 2006, provisional application No. 60/894,078, filed on Mar. 9, 2007.

(51) Int. Cl.
*C21D 7/02* (2006.01)
*C21D 8/00* (2006.01)

(52) U.S. Cl. ........ 148/650; 148/610; 148/676; 148/608; 148/651; 148/677; 277/940; 277/595; 277/653; 29/888.3

(58) Field of Classification Search .................. 148/603, 148/610, 650, 651, 325–326, 419, 442, 410, 148/427, 677, 676, 608; 277/650–654, 936, 277/595, 940; 29/888.3
See application file for complete search history.

(56) References Cited

U.S. PATENT DOCUMENTS

| | | | |
|---|---|---|---|
| 3,655,209 A | 4/1972 | Polyakov et al. |
| 3,909,310 A | 9/1975 | Uy |
| 4,094,514 A | 6/1978 | Johnson |
| 4,281,841 A | 8/1981 | Kim et al. |
| 4,386,969 A | 6/1983 | Kilbert |
| 4,756,537 A | 7/1988 | Beyer et al. |
| 5,158,305 A | 10/1992 | Halling |
| 5,286,039 A | 2/1994 | Kawaguchi et al. |

(Continued)

FOREIGN PATENT DOCUMENTS

JP 363206428 8/1988

(Continued)

OTHER PUBLICATIONS

Machine-English translation of Japanese patent 09-279315, Koga Takeshi et al., Oct. 28, 1997.*

(Continued)

*Primary Examiner* — Deborah Yee

(74) *Attorney, Agent, or Firm* — Robert L. Stearns; Dickinson Wright, PLLC

(57) ABSTRACT

A metal gasket formed from a suitable iron-nickel chromium alloy includes at least one embossment that exhibits essentially full functional recovery at temperatures exceeding 1000° F. and including in the range of 1100° F. to 1600° F. or more and which is made from sheet material that is work hardened and strengthened by cold rolling, or a combination of cold rolling and precipitation hardening, without any post embossment heat treating that would act to further harden the material. Suitable iron-nickel-chromium alloys include those comprising, by weight, greater than 18% nickel; greater than 14% chrome and 0.1-10% of at least one element selected from the group consisting of Mo, Ti, V, Al, Co, Nb, Ta and Cu, with the balance being substantially Fe, wherein the gasket sheet alloy has a deformed microstructure.

9 Claims, 6 Drawing Sheets

U.S. PATENT DOCUMENTS

| | | |
|---|---|---|
| 5,310,196 A | 5/1994 | Kawaguchi et al. |
| 5,348,315 A | 9/1994 | Kawaguchi et al. |
| 5,360,219 A | 11/1994 | Okuda et al. |
| 5,636,850 A | 6/1997 | Kashmerick |
| 6,096,181 A | 8/2000 | Friese et al. |
| 6,299,175 B1 | 10/2001 | Maekawa et al. |
| 6,338,762 B1 | 1/2002 | Sato et al. |
| 6,352,670 B1 | 3/2002 | Rakowski |
| 6,575,473 B2 | 6/2003 | Sugimoto et al. |
| 6,588,765 B2 | 7/2003 | Hiramatsu et al. |
| 6,730,264 B2 | 5/2004 | Cao |
| 6,749,701 B2 | 6/2004 | Hiramatsu et al. |
| 6,769,696 B2 | 8/2004 | Diez et al. |
| 6,893,727 B2 | 5/2005 | Adachi et al. |
| 7,059,609 B1 | 6/2006 | Locke et al. |
| 7,135,519 B2 | 11/2006 | Atkinson et al. |
| 2004/0121169 A1 | 6/2004 | Adachi et al. |
| 2004/0156737 A1 | 8/2004 | Rakowski |
| 2004/0195782 A1 | 10/2004 | Bram et al. |
| 2005/0046121 A1 | 3/2005 | Jones et al. |
| 2006/0006609 A1 | 1/2006 | Sandford et al. |

FOREIGN PATENT DOCUMENTS

| | | |
|---|---|---|
| JP | 409279315 | 10/1997 |
| JP | 2002317251 | 10/2002 |
| JP | 2006-070314 | 3/2006 |

OTHER PUBLICATIONS

Machine-English translation of Japanese patent 10-068050, Katsuragi Susumu et al., Mar. 10, 1998.*

* cited by examiner

METHOD OF MAKING AN EMBOSSED METAL GASKET

CROSS-REFERENCES TO RELATED APPLICATIONS

This patent application claims priority to U.S. Provisional Patent Application Ser. Nos. 60/822,897 and 60/894,078, filed on Aug. 18, 2006 and Mar. 9, 2007, respectively, and U.S. patent application Ser. No. 11/773,200, filed Jul. 3, 2007, now U.S. Pat. No. 7,708,842 B2 issued May 4, 2010 which are hereby incorporated herein by reference in their entirety.

BACKGROUND OF THE INVENTION

1. Technical Field

This invention relates generally to metal gaskets. More particularly, it relates to embossed metal gaskets made from high temperature alloys. Even more particularly, to embossed metal gaskets made from high temperature iron-nickel-chromium alloys that are adapted to operate at temperatures greater than 1100° F.

2. Related Art

It is well known to use embossed metal gasket sheets for high temperature clamped joints of internal combustion engines, including Diesel engines, that require a fluid seal, such as head and exhaust gaskets. These embossments can be formed in many shapes and sizes, including full and half embossments, depending on the fluid channel to be sealed, but in the case of full embossments will frequently comprise a substantially circular arc that is a function of the thickness, T, of the sheet with a width on the order of about 10-20 T and a height of about 0.5-2.5 T.

Many metal sheet materials, including numerous types of steels and stainless steels have been used to make embossed metal gaskets. For example, type 301 stainless steel fully hardened by cold reduction (301 FH SS) has been successfully used in many gasket applications with operating temperatures up to about 800-900° F. However, at temperatures above about 1000° F. this material is susceptible to creep, stress relaxation and other high temperature phenomena such that it loses a significant portion of its strength causing the embossments take a heat set and fail to maintain, or recover once unclamped, a sufficient amount of the original embossed height to provide an operable seal. Thus, 301FH SS is not a desirable gasket material for these applications either because it loses the ability to effectively and operably seal many clamped joints altogether, or because the use of this material would require too many gasket layers to economically or reliably provide the seal height necessary to operably seal the joint.

As described in published patent application EP1429057 A1, Type 316Ti stainless steel alloy has somewhat improved high temperature strength and other properties, including height recovery properties, as compared to type 301 FH SS, which make it suitable for use in certain high temperature embossed metal gasket applications. This material performs well at temperatures somewhat above 800-900° F., but also loses sufficient strength at temperatures above about 1000° F., where the embossments also take a heat set and fail to recover a sufficient amount of their original embossed height to provide an operable seal as described above.

As internal combustion engines continue to employ new technologies to improve the combustion process and achieve exhaust emission reductions, increased fuel efficiency and the like, the operating temperatures to which the clamped joints and embossed metal gaskets used in these engines are exposed continue to increase, making materials that once performed well in gasket applications, such as various types of stainless steels, including 301FH SS and 316 Ti, either undesirable or unsuitable for use in certain applications with respect to economic, performance or other considerations. The recovery performance of various stainless steel alloys currently used as gasket materials is shown in FIG. 1 to illustrate this point. As the recovered height performance decreases, particularly at temperatures exceeding 1000° F., the number of gasket layers required to operably seal a joint increases.

For example, the trend in the design of at least some modern Diesel engines for marine applications has been to insulate the exhaust system (e.g., the exhaust manifold, down pipe and/or muffler) in order to eliminate water jacket cooling, thereby increasing the operating temperature of the joint between the exhaust manifold and engine block, and the associated metal gasket, to temperatures above those which can be effectively sealed by 301 FH or 316 Ti stainless steels.

In another example, other Diesel engines are designed to recirculate a portion of the exhaust gas stream back into the combustion chamber in an effort to reduce emissions, which adds additional hot components and joints that must be sealed for the engine and engine control systems to operate properly. In many applications, temperatures in the vicinity of the exhaust manifold gasket exceed 1100° F. and can reach temperatures between 1400 to 1600° F. or more, making the traditional 301 FH SS and 316 Ti alloys unsuitable as gasket material.

One material that has been used successfully for gasket applications that exceed 1100° F. is Inconel® 718. In these applications, gasket sheets are formed to shape and embossed in the annealed (i.e., solution heat treated) state to provide sufficient ductility to perform these processes without cracking the material. They are then given a precipitation hardening heat treatment following embossment at temperatures of between about 1200-1350° F. to harden and strengthen the gaskets to provide sufficient strength to the gasket sheet and embossments for operation at temperatures above 1100° F. While suitable from a performance standpoint, this material is considerably more expensive than the 301 FH SS and also requires post-embossment heat treating which adds to cost and complexity to the manufacture of these gaskets.

Therefore, there remains a need for improved embossed gaskets for use at operating temperatures above those for which 301 FH SS and 316Ti may be used, as well as materials and methods of their manufacture.

SUMMARY OF THE INVENTION

The present invention provides an inexpensive solution to the problem of providing a commercially suitable material for high temperature metal gasket applications exceeding operating temperatures of 1100° F.

According to one aspect of the invention, a metal gasket of an iron-nickel-chromium alloy is provided that includes embossments that exhibit essentially full functional recovery at temperatures greater than 1000° F. and which is made from metal sheet material that is cold rolled and whose embossments are work hardened and at full operational strength without any post embossment heat treating that would act to harden the material and with retention of at least a portion of a work-hardened microstructure.

According to a further aspect of the invention, the gaskets are made of precipitation hardenable iron-nickel-chromium alloys which are first hardened through cold rolling, precipitation hardened by a precipitation hardening heat treatment and then embossed to form and work harden the embossments, after which there is no post-embossment heat treatment that would act to harden the material.

According to a further aspect of the invention, any iron-nickel-chromium alloy that responds to the cold roll/work harden embossment processing without post-embossment heat treating that would act to further harden the material is contemplated for use in making a gasket of this type.

According to a further aspect of the invention, any alloy that responds to cold roll work hardening followed by coil form precipitation hardening and then embossment processing without post-embossment heat treating that would act to further harden the material is contemplated for use in making a gasket of this type.

According to a further aspect of the invention, a gasket sheet having at least one embossed sealing bead made from an alloy including, by weight: >18% Ni, >14% Chrome; 0.1-10% of at least one element selected from the group consisting of Mo, Ti, V, Al, Co, Nb, Ta and Cu; and the balance substantially Fe with the gasket sheet having a deformed work hardened microstructure is contemplated for use as a gasket of the invention.

According to a further aspect of the invention, a gasket sheet having at least one embossed sealing bead made from an iron-nickel-chromium alloy including, by weight: 18-28% Ni; 18-23% Cr; 0-8% Mo; 0-1.5% Cu; 0-1% Si; 0-3% Mn; 0-0.6% Ti; 0-0.6% Al; 0-0.08% C; 0-0.015% S; 0-0.03% P; 0-0.4% N; and the balance substantially Fe, is contemplated for use as a gasket of the invention.

According to a further aspect of the invention, a gasket sheet having iron-nickel-chromium alloy which includes, by weight: 24-55% Ni; 13.5-21% Cr; 1-3.3% Mo; 0-0.15% Cu; 0-1% Si; 0-2% Mn; 0.65-2.3% Ti; 0-0.8% Al; 0-0.5% V; 0.001-0.01% B; 0-1% Co; 0-5.5% of the sum of Nb or Ta; 0-0.08% C; 0-0.015% S; 0-0.015% P; and the balance substantially Fe is contemplated for use as a gasket of the invention.

According to a further aspect of the invention, the invention includes a method of making an embossed metal gasket including the steps of: forming an annealed sheet of an iron-nickel-chromium alloy; deforming said annealed sheet to form a deformed sheet having a deformed microstructure; and forming a gasket from said deformed sheet having at least one embossed sealing bead, said embossed sealing bead sealably operable with substantially full functional recovery in a fully-clamped sealed joint at a temperature greater than 1100° F.

According to a further aspect of the invention, iron-nickel-chromium alloy gasket sheets of the invention may be coated with a heat resistant coating. The heat resistant coating may include chemically exfoliated vermiculite, a high temperature organic resin, a supplementary inorganic resin and a flaky filler.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
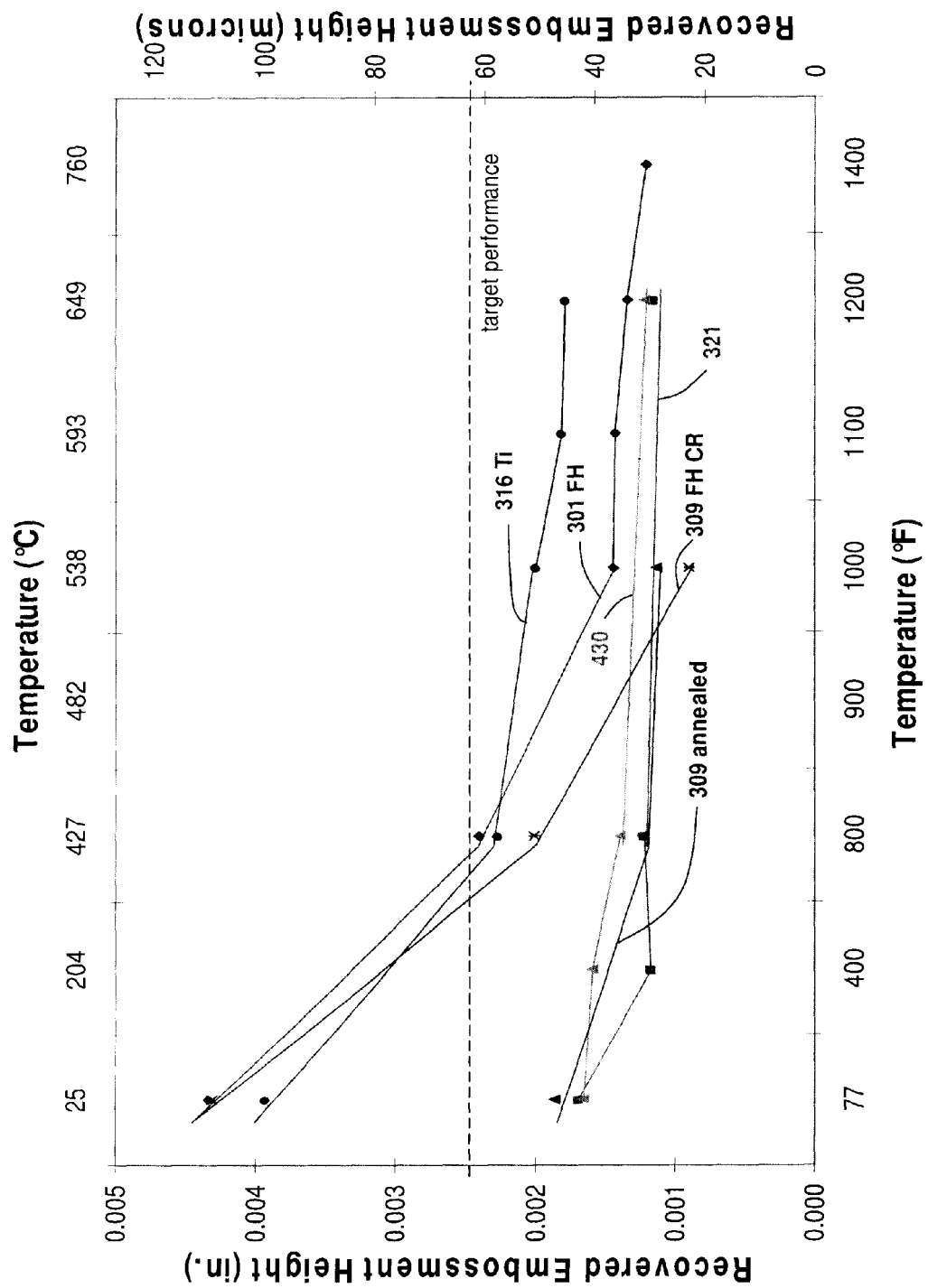
FIG. 1 is a graph of the recovered embossed height as a function of temperature for several prior art metal gasket alloys subjected to a clamp test.
Figure 2:
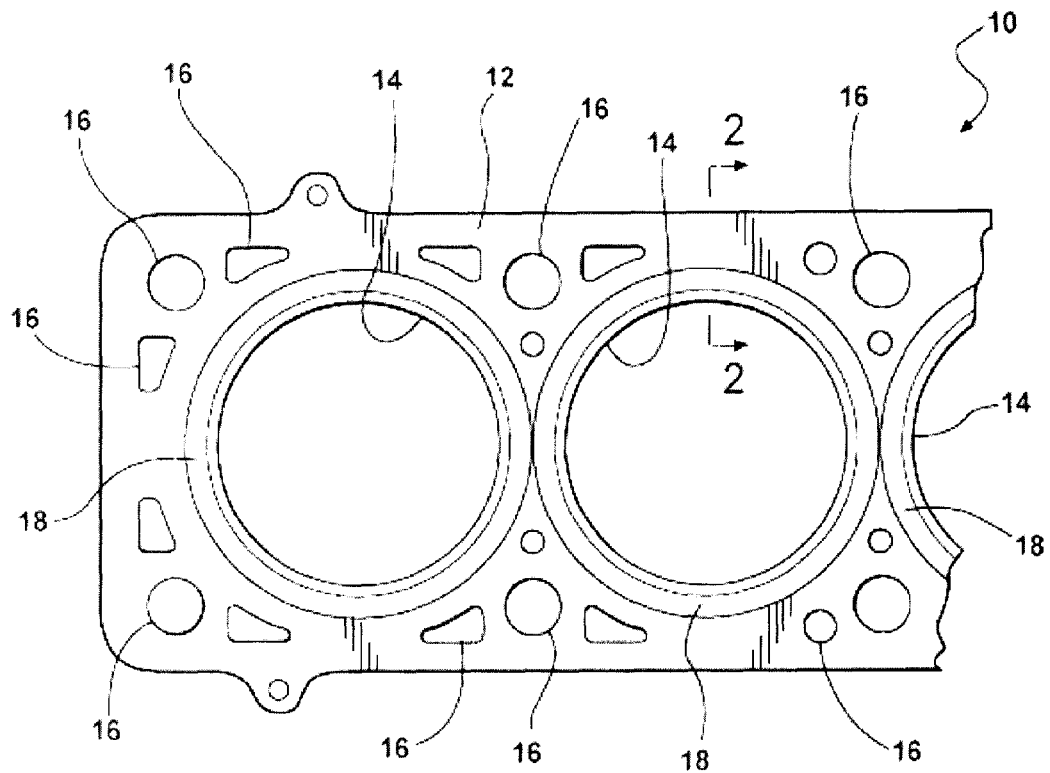
FIG. 2 is a plan view of a gasket constructed according to one exemplary embodiment of the invention.
Figure 3:
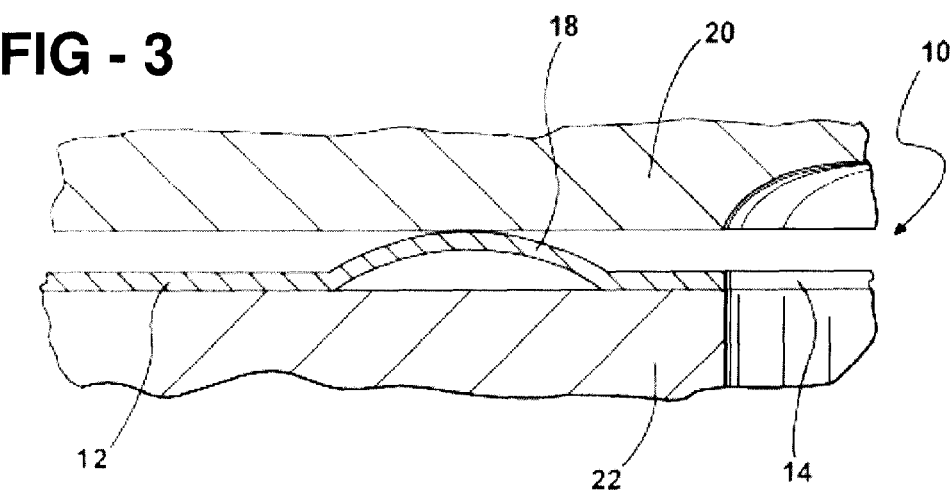
FIG. 3 is an enlarged fragmentary cross-sectional view of a portion of the gasket of FIG. 1.

FIGS. 1 and 2 illustrate an embossed metal gasket 10 constructed according to an exemplary embodiment of the present invention. Single or multi-layer embossed metal gaskets are contemplated and are to be included within the scope of the invention.

The gasket 10 includes at least one metal layer 12. Metal layer 12 is fabricated of metal sheet material that has been stamped or otherwise formed to include at least one fluid conveying opening 14. The layer 12 may also include additional openings 16 to receive fasteners (not shown), such as threaded bolts and the like, which may be used to clamp the gasket 10 between a first joint member 20 and a second joint member 22, such as an exhaust manifold (not shown) and an engine block (not shown) to be sealed by the gasket 10 thereby forming a sealed joint. First joint member 20 and second joint member 22 and gasket 10 are shown in FIG. 2 in an unclamped state with the components in their respective locations just prior to clamping.

The at least one metal layer 12 may be fabricated from a suitable iron-nickel-chromium alloy, including certain precipitation hardenable alloys. The metal sheet material of the selected iron-nickel-chromium alloy is cold rolled to work harden the material in order to develop a tensile strength in the range of at least 1000 MPa measured at room temperature and an elongation that is as large as possible and at least 5%, and more particularly 5-25%, and even more particularly 5-10%, and most particularly 6-9%. The metal sheet material must have sufficient ductility and elongation to permit a desired gasket form to be excised from a sheet or roll and processed to form the necessary openings and embossments as described herein, or vice versa, by various combinations of rolling, stamping, pressing and other known processing methods for forming embossed gaskets without cracking the material and while also imparting sufficient tensile strength to function as a gasket and maintain adequate strength at high temperatures exceeding 1000° F. so that it continues to provide a seal to the joint in which it is installed under high temperature operating conditions. When the metal sheet material comprises precipitation hardenable iron-nickel-chromium alloy, the material may also be precipitation hardened following cold rolling to further enhance the high temperature properties of the gasket 10 using a suitable precipitation hardening heat treatment.

Following cold rolling and any precipitation hardening heat treatment, the sheet material can be blanked into gaskets to form the various openings mentioned above. During the blanking operation, or in a separate operation either before or after blanking, the blanks can be embossed to produce at least one seal embossment or bead 18 surrounding at least one of the openings 14. The embossment 18 may be a full embossment, typically a circular arc or other curved portion, or a half embossment where a portion of the surface of the sheet is raised with respect to other portions, typically through the use of a series of complementary radii or circular arcs or other curved portions. This embossment 18 comprises a spring member incorporated into the gasket sheet which applies a force against the surface of the respective joint members 20,22 sufficient to seal a fluid opening. The cold work and deformation imparted during the embossment step does not add any significant additional strength to the metal sheet in the portion thereof which includes embossment 18, although the invention does not preclude deformation sufficient to provide additional mechanical strength to the sheet material, particularly in the region proximate the embossment, in this step. Gaskets 10 made from the preferred cold-rolled iron-nickel-chromium alloy materials will have sealing beads 18 that, when clamped under operational loads at operational temperatures exceeding 1000° F. for the operational life of the gasket will maintain resiliency sufficient to provide an adequate sealing stress on the surfaces of the sealed joint so as to maintain an adequate seal. This aspect of the gaskets 10 of the present invention can be tested by clamping the gasket under operating conditions for an extended period of time under temperature, joint load, environmental and other conditions representative of what the gasket 10 would see for a given engine application over the life of the gasket, or the conditions required to meet engine qualification standards, and namely temperatures exceeding the 1000° F. threshold, and including temperatures up to 1400° F., and even temperatures exceeding 1600° F. An embossed metal gasket 10 under these conditions should maintain its ability to seal throughout the expected life of the gasket. Those skilled in the art of hot gaskets will appreciate that there may be a number of ways to measure retained resiliency, with all having in common the desire to test whether a gasket is able to survive under given temperature, joint load, environmental and other conditions without fail. The specific details of the test itself is not important, but rather demonstration of the ability of the gasket to perform in a sealed joint under test conditions which are representative of engine operating conditions where the gasket will see temperatures exceeding 1000° F., and perhaps temperatures above 1400° F. and up to and even exceeding 1600° F.

Figure 4:
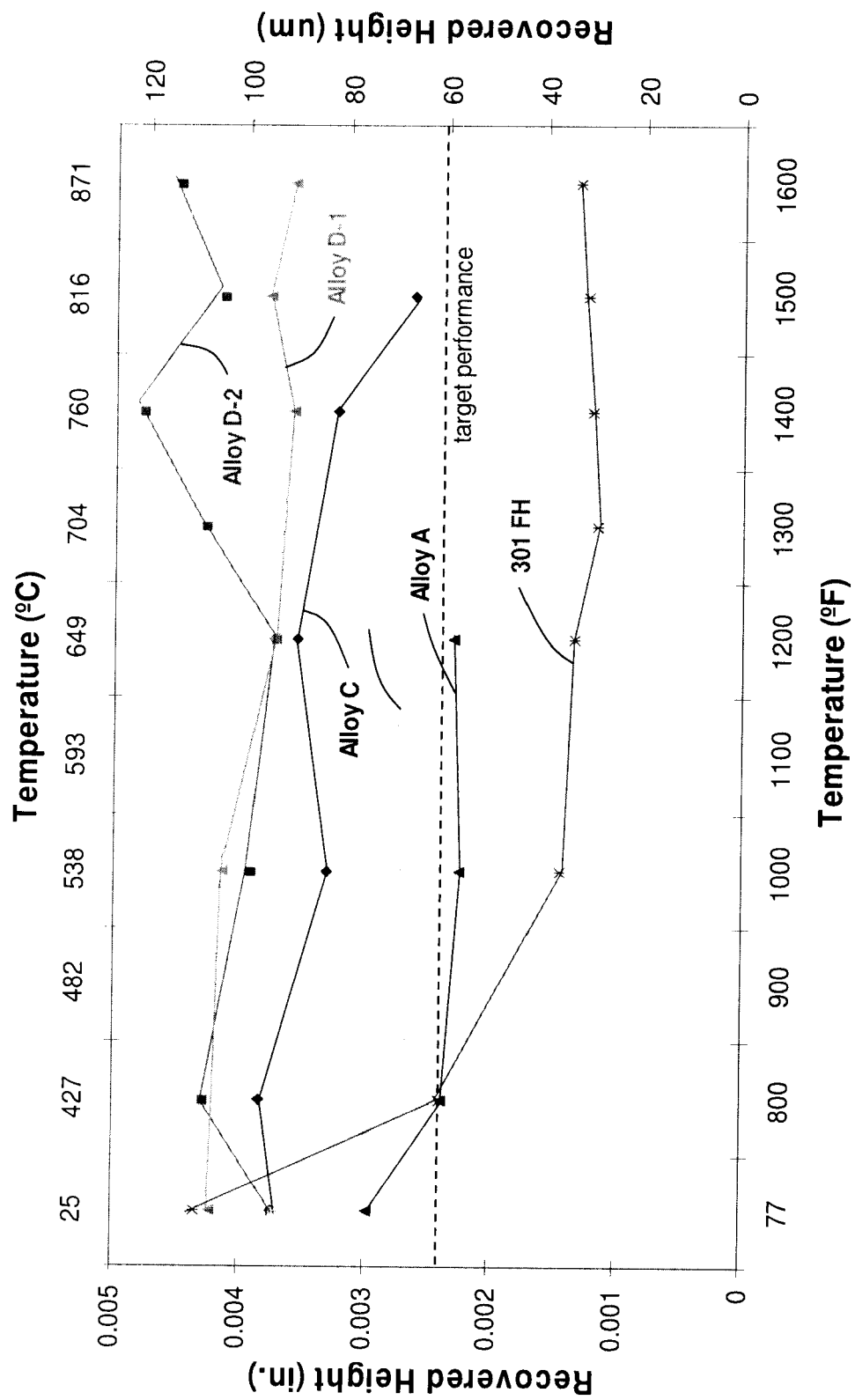
FIG. 4 is a graph of the recovered embossed height as a function of temperature for several alloys of the invention subjected to a clamp test.

One test that is suitable involves preparing a test washer of a suitable cold rolled metal sheet material having an opening and a full embossment, representative of embossment or sealing bead 18, surrounding the opening. The washer has an OD of 2.75 inches, and ID of 1.75 inches and a material thickness, T, of about 0.010 inches. The starting bead height is 1.5 T, or 0.015 inches above the top surface of the body of the metal layer. The washer is clamped between two 1 inch thick platens with a grade 5 bolt under a joint load of 1000 PLI (Pounds per Linear Inch) and then heated at a temperature representative of an engine operating temperature for 17 hours, removed and the height of the bead above body remeasured. It is an accepted industry standard that a minimum recovered bead height of 0.0025 inches over the top surface of the body is acceptable to maintain an adequate seal for the life of the gasket at the measured test temperature, and corresponds to an essentially full functional or operational recovery of the bead. Thus, this level of performance of minimum recovered bead height is identified as a target performance level. However, it is also recognized that recovery performance which exceeds this minimum recovered bead height is extremely desirable and useful because it relates directly to and impacts the gasket design. For example, performance improvements in the gasket material which result in a recovered bead height above the minimum described herein enable a gasket to be designed with a reduced number of layers. Reduction in the number of layers of the gasket will typically translate to a reduction in cost and enhance the reliability of the gasket, or both, since the use of additional layers can lead to an increased probability of failure at the gasket due to the enhanced probability of a defect which can lead to failure of the gasket being located in any one of the multiple gasket layers. As shown in FIG. 4, washers made of the five alloys shown in the chart below were tested at various temperatures including 1000° F., 1200° F., 1400° F., 1500° F. and 1600° F. and were all found to fall within the acceptable standard of bead recovery, with the final bead height of all samples meeting or exceeding the target performance being at least 0.0025 inches over the surface of gasket body, with the exception of Alloy A which exhibited performance which was very close to the target performance and for the reasons described below also comprises a gasket sheet material of the invention. The sheet materials of the invention all demonstrated improved performance over prior art sheet materials, including those of FIG. 1, in that they exhibited full functional recovery of the embossment at temperatures over 1000° F., including temperatures exceeding 1100° F., with the exception of Alloy A that exhibited substantially full functional recovery as described further below.

It is believed that some of the suitable iron-nickel-chromium alloys of the invention which may be precipitation hardenable may also benefit from a combination of cold working and precipitation hardening. As such, the invention contemplates that after the cold rolling step, the sheet material may also be given a precipitation hardening heat treatment in coil form to develop the desired strength and elongation properties mentioned. Those skilled in the art of material selection and heat treating will understand without undue experimentation or invention that, depending upon the particular composition of the alloy and the desired end properties to be achieved, a precipitation hardening heat treat cycle can be carried out to achieve the desired end result. For example, some of the precipitation hardenable alloys contemplated by the present invention and described in more detail below may benefit from a precipitation hardening heat treat cycle following cold rolling, generally at temperatures above 1000° F. for about 8-15 hrs. Suitable precipitation hardenable alloy compositions are high nickel, high chromium alloys with additions to facilitate precipitation hardening, such as are also described further herein.

TABLE 1

| | Alloy | | | | |
|---|---|---|---|---|---|
| Element | 301 FH (comparative) wt % | Alloy A wt % | Alloy B wt % | Alloy C wt % | Alloy D wt % |
| C | 0.03-0.15 | 0.08 mx | 0.020 mx | 0.08 mx | 0.08 mx |
| Mn | 2.00 mx | 1.00 mx | 3.00 mx | 2.00 mx | 0.35 mx |
| S | 0.030 mx | 0.015 mx | 0.01 mx | | 0.015 mx |
| P | 0.045 mx | | 0.03 mx | | 0.015 mx |
| Si | 1.00 mx | 1.00 mx | 0.05 mx | 1.00 mx | 0.35 mx |
| Cr | 16.00-18.00 | 18-22 | 20.5-23.0 | 13.5-16.00 | 17.00-21.00 |
| Ni | 6.00-8.00 | 18-22 | 26.0-28.0 | 24.00-27.00 | 50.00-55.00* |
| Mo | 0.80 mx | | 6.50-8.00 | 1.00-1.50 | 2.80-3.30 |
| N | 0.09 mx | | 0.30-0.40 | | |
| Ti | | 0.60 mx | | 1.90-2.30 | 0.65-1.15 |
| V | | | | 0.10-0.50 | |
| Al | | 0.60 mx | | 0.35 mx | 0.35-0.80 |
| B | | | | 0.003-0.010 | 0.001-0.006 |
| Co | | | | | 1.00 mx |
| Nb + Ta | | | | | 4.75-5.50 |

TABLE 1-continued

| | Alloy | | | | |
|---|---|---|---|---|---|
| Element | 301 FH (comparative) wt % | Alloy A wt % | Alloy B wt % | Alloy C wt % | Alloy D wt % |
| Cu | | 0.75 mx | 0.50-1.50 | | 0.15 mx |
| Fe | bal | bal | bal | bal | bal |

While not intending to be limited, the compositions of the desired alloys may be in the range, in weight percent, of >18% Ni, >14% Cr, from 0.1 to 10% of at least one of Mo, Ti, V, Al, Co, Nb, Ta or Cu and the balance Fe with incidental impurities allowed as well as other additions that do not detract from the desired properties. Specific examples of suitable alloys of the invention within the above range include Alloys A-D summarized in Table 1 and described below.

Alloy A may be described as including, by weight: 18-22% Ni; 18-22% Cr; 0-0.75% Cu; 0-1% Si; 0-1% Mn; 0-0.6% Ti; 0-0.6% Al; 0-0.08% C; 0-0.015% S; and the balance substantially Fe. As described above, Alloy A may also include other alloying additions so long as the resultant alloy has mechanical properties consistent with manufacture and installation of the gasket and substantially full recovery of the gasket height at temperatures exceeding 1100° F. As may be seen in FIG. 4, the recovered height of Alloy A was slightly below 0.0025 inches over the surface of the gasket at temperatures above 1000° F.; however, as may be seen from FIG. 1 and FIG. 4, this performance was better than either 301FH or 316Ti, and at higher temperatures, including temperatures exceeding about 1100° F., the performance improvement was even greater. Thus, in view of the stability of the performance of Alloy A and the demonstrated improvement over the performance of 301FH and 316Ti, Alloy A exhibits substantially full functional recovery at temperatures exceeding 1100° F., including at least 1200° F. Alloy A is not believed to be a precipitation hardenable alloy, although some precipitation hardening may occur if subjected to a precipitation hardening heat treatment as described herein. Thus, while not precluded, it is preferred that sheet materials of Alloy A be processed as described herein by cold rolling to impart the desired cold work without receiving a precipitation hardening heat treatment.

Alloy B may be described as including, by weight: 26-28% Ni; 20.5-23.0% Cr; 6.5-8% Mo; 0.5-1.5% Cu; 0-0.05% Si; 0-3% Mn; 0-0.020% C; 0-0.01% S; 0-0.03% P; 0.3-0.4% N; and the balance substantially Fe. As described above, Alloy B may also include other alloying additions so long as the resultant alloy has mechanical properties consistent with manufacture and installation of the gasket and substantially full recovery of the gasket height at temperatures exceeding 1100° F. As may be seen in FIG. 4, the recovered height of Alloy B was above 0.0025 inches over the surface of the gasket at temperatures above 1000° F. Thus, Alloy B exhibits full functional recovery at temperatures exceeding 1100° F., including at least 1200° F. Alloy B is not believed to be a precipitation hardenable alloy, although some precipitation hardening may occur if subjected to a precipitation hardening heat treatment as described herein. Thus, while not precluded, it is preferred that sheet materials of Alloy B be processed as described herein by cold rolling to impart the desired cold work without receiving a precipitation hardening heat treatment.

It is believed that Alloys A and B are representative of a number of other non-precipitation hardenable iron-nickel-chromium alloys that may be described generally as those having, by weight, >18% Ni, >14% Cr, from 0.1 to 10% of at least one of Mo, Ti, V, Al, Co, Nb, Ta or Cu and the balance Fe and incidental impurities, and more particularly as those falling within the constituent ranges of these alloys and having, by weight: 18-28% Ni; 18-23% Cr; 0-8% Mo; 0-1.5% Cu; 0-1% Si; 0-3% Mn; 0-0.6% Ti; 0-0.6% Al; 0-0.08% C; 0-0.015% S; 0-0.03% P; 0-0.4% N; and the balance substantially Fe. It is believed that these alloys will exhibit at least substantially full functional recovery at temperatures exceeding 1100° F., including at least 1200° F. These alloys are generally not believed to be precipitation hardenable alloys, although some precipitation hardening may occur if subjected to a precipitation hardening heat treatment as described herein. Thus, while not precluded, it is preferred that sheet materials of these alloys be processed as described herein by cold rolling to impart the desired cold work without receiving a precipitation hardening heat treatment.

Alloy C may be described as including, by weight: 24-27% Ni; 13.5-16% Cr; 1-1.5% Mo; 0-1% Si; 0-2% Mn; 0-0.08% C; 1.9-2.3% Ti; 0.1-0.5 V; 0-0.35% Al; 0.003-0.01% B; and the balance substantially Fe. As described above, Alloy C may also include other alloying additions so long as the resultant alloy has mechanical properties consistent with manufacture and installation of the gasket and substantially full recovery of the gasket height at temperatures exceeding 1100° F. As may be seen in FIG. 4, the recovered height of Alloy C was substantially above 0.0025 inches over the surface of the gasket at temperatures above 1000° F. Thus, Alloy C also exhibits full functional recovery at temperatures exceeding 1100° F., including at least 1500° F. Alloy C is a precipitation hardenable alloy. Thus, while cold rolling alone is not precluded, it is preferred that sheet materials of Alloy C be processed as described herein by cold rolling to impart the desired cold work followed by an additional precipitation hardening heat treatment as described herein prior to the forming of embossments. This heat treatment imparts greater strength to these alloys and more than offsets any reduction of the cold work and associated strength increase imparted by cold rolling, as such alloys evidence a cold worked microstructure following the precipitation hardening heat treatment.

Alloy D is illustrated in FIG. 4 by Alloy D-1 and Alloy D-2 which represented different heats of this material. Alloy D may be described as including, by weight, 50-55% Ni; 17-21% Cr; 2.8-3.3% Mo; 0-0.15% Cu; 0-0.35% Si; 0-0.35% Mn; 0.65-1.15% Ti; 0.35-0.8% Al; 0.001-0.006% B; 0-1% Co; 4.75-5.5% of the sum of Nb or Ta; 0-0.08% C; 0-0.015% S; 0-0.015% P; and the balance substantially Fe. As described above, Alloy D may also include other alloying additions so long as the resultant alloy has mechanical properties consistent with manufacture and installation of the gasket and substantially full functional recovery at temperatures exceeding 1100° F., including at least 1600° F. As may be seen in FIG. 4, the recovered height of Alloy D was substantially above 0.0025 inches over the surface of the gasket at temperatures above 1000° F. Thus, Alloy D also exhibits full functional recovery at temperatures exceeding 1100° F., including at least 1600° F. Alloy D is a precipitation hardenable alloy. Thus, while cold rolling alone is not precluded, it is preferred that sheet materials of Alloy D be processed as described herein by cold rolling to impart the desired cold work followed by an additional precipitation hardening heat treatment as described herein prior to the forming of embossments.

It is believed that Alloys C and D are representative of a number of other precipitation hardenable iron-nickel-chromium alloys that may be described generally as those having, by weight, >18% Ni, >14% Cr, from 0.1 to 10% of at least one of Mo, Ti, V, Al, Co, Nb, Ta or Cu and the balance Fe and incidental impurities, and more particularly as those falling within the constituent ranges of these alloys and having, by weight: 24-55% Ni; 13.5-21% Cr; 1-3.3% Mo; 0-0.15% Cu; 0-1% Si; 0-2% Mn; 0.65-2.3% Ti; 0-0.8% Al; 0-0.5% V; 0.001-0.01% B; 0-1% Co; 0-5.5% of the sum of Nb or Ta; 0-0.08% C; 0-0.015% S; 0-0.015% P; and the balance substantially Fe. It is believed that these alloys will exhibit full functional recovery at temperatures exceeding 1100° F., including at least 1500° F., and as indicated by Alloy D, even temperatures exceeding 1600° F. These alloys are generally believed to be precipitation hardenable alloys, although the effectiveness of precipitation hardening may vary over the range of alloy compositions described above. Thus, while cold rolling alone is not precluded, it is preferred that sheet materials of Alloy D be processed as described herein by cold rolling to impart the desired cold work followed by an additional precipitation hardening heat treatment as described herein prior to the forming of embossments.

Figure 5:
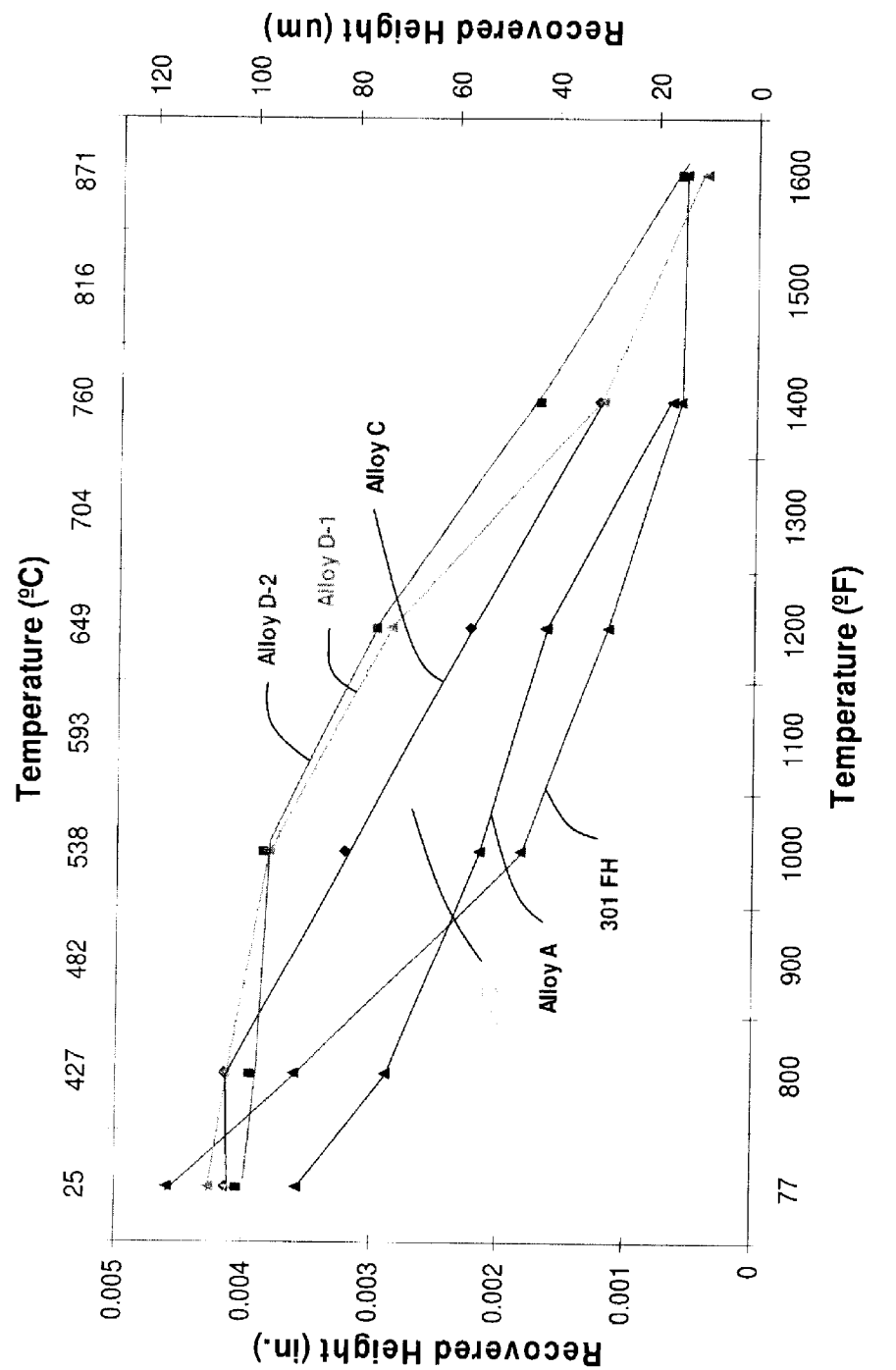
FIG. 5 is a graph of the recovered embossed height as a function of temperature for several alloys of the invention subjected to a constant load clamp test.

FIG. 5 provides additional evidence of the full functional recovery exhibited by iron-nickel-chromium alloy gaskets of the invention. Test specimens of Alloys A-D as described above were subjected to a high-temperature, constant-load test where they were held at the temperatures shown in a test fixture that was adapted to maintain a constant load similar to the initial load of the fixture described above. Due to the constant load aspects, this is a more severe test of the recovery characteristics of the alloys of the invention than that described above and reported in FIG. 5. As may be seen, the alloys also exhibited full functional recovery under the more severe test conditions.

Figure 6:
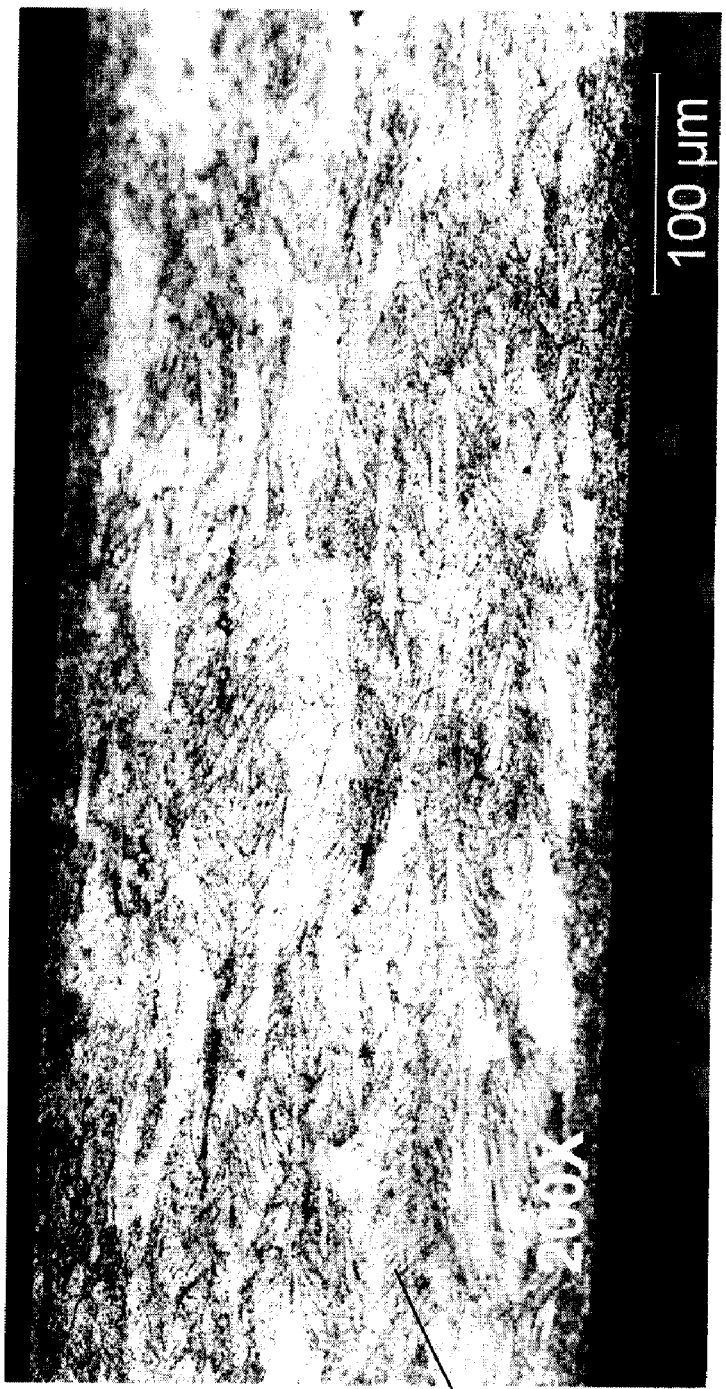
FIG. 6 is a photomicrograph of the microstructure of a cross-sectional sample of a gasket sheet of the invention taken at a magnification of 200×.

The seal beads or embossments 18, as a result of the cold rolling and embossing, are work hardened which is evidenced by the directional grain structure of the metal sheet beads as compared to the pre-cold rolled and embossed state of the material as illustrated generally in FIG. 6. While the microstructures of alloys of the invention may vary as to the degree of cold work evidenced in the microstructure, such as by those alloys that have been precipitation hardened following cold working exhibiting less directional grain structure than those that are not precipitation hardened. Nonetheless, alloys of the invention should exhibit microstructural evidence of residual cold work and a lack of post-embossment heat treating.

Once the beads 18 are formed, it is preferred that the at least one metal layer 12 is not heat treated or further processed, but particularly in a manner that would serve to further harden the beads 18, such as by performing any additional precipitation hardening heat treatments. Regardless, any post-embossment heat treatment or other processing of gasket 10 is performed under conditions so as to retain at least a portion of the cold work or precipitation hardening or both described above, consistent with maintenance of the tensile strength, ductility and high temperature recovery performance described herein. In other words, the beads 18 derive their final strength and hardness at the time the beads are formed and nothing is done to alter them or to strengthen them further once they are formed, including post-embossment heat treating.

Figure 7:
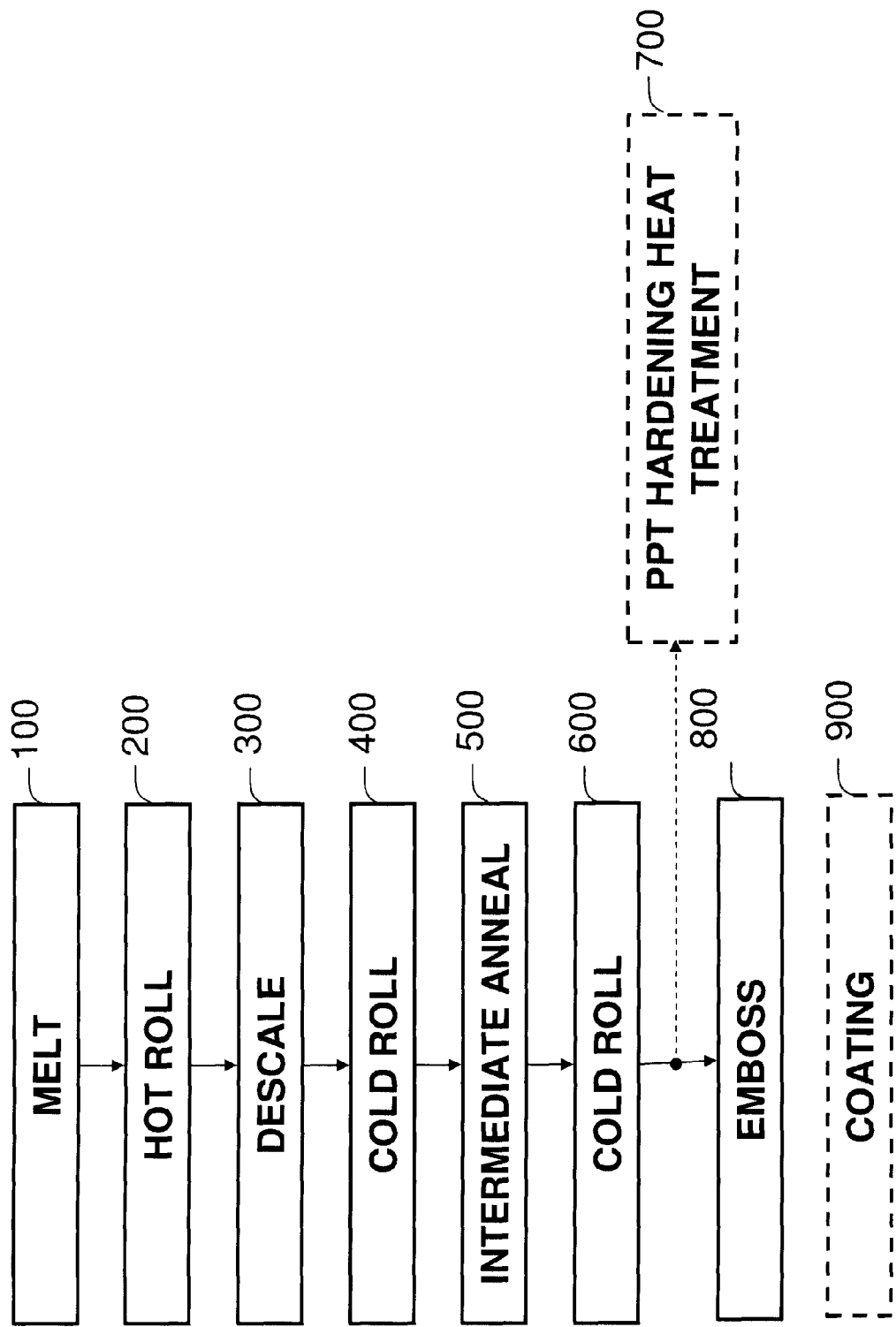
FIG. 7 is a flow chart of the method of the invention.
Figure 4:
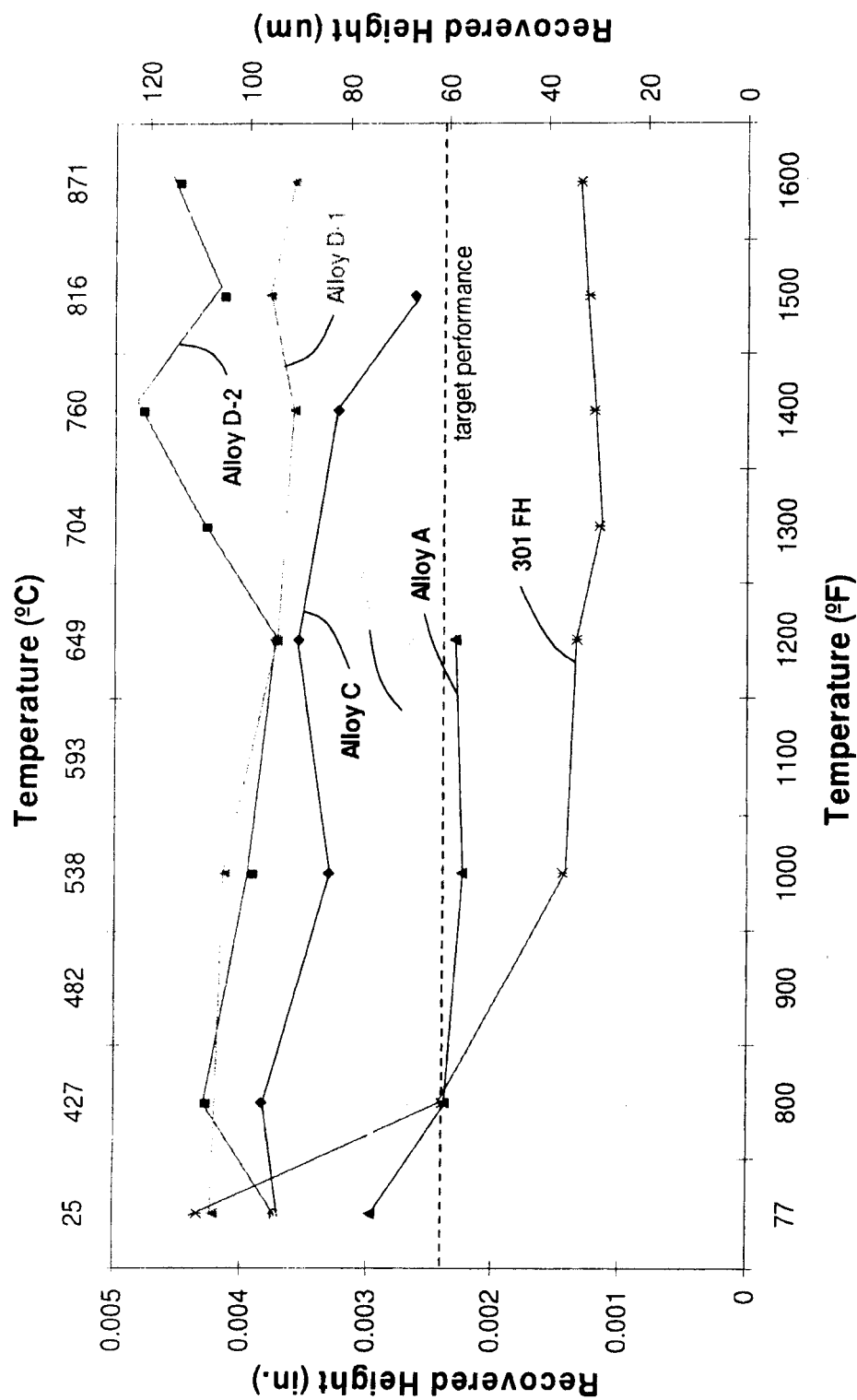
Figure 5:
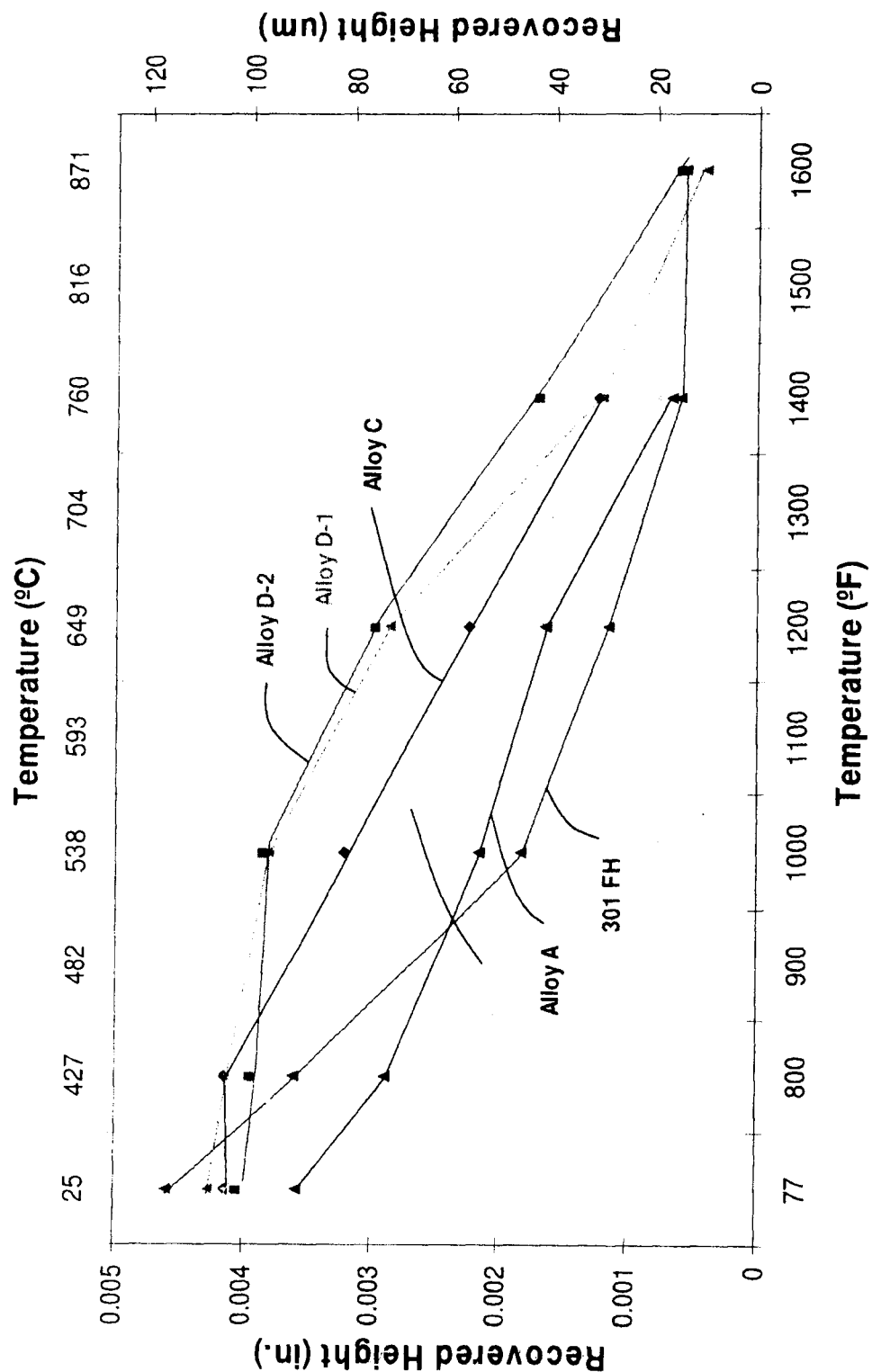

Referring to FIG. 7, embossed gaskets of the invention may be made by a method including the steps of: forming an annealed sheet of an iron-nickel-chromium alloy; deforming the annealed sheet to form a deformed sheet having a deformed microstructure; and forming a gasket from the deformed sheet having a least one embossed sealing bead; the embossed sealing bead sealably operable with substantially full functional recovery in a fully-clamped, sealed joint at a temperature of greater than 1100° F. The method will of course include a step of forming a melt 100 of a suitable iron-nickel-chromium gasket material. The melt of the alloy will then be formed in an intermediate step by solidification into a slab by continuous casting or into a cast billet. The slab or billet will then be formed by a step of hot rolling 200 into one or more continuous rolls of the material. The hot rolled material will generally have a thickness in a range of between about 0.18-0.25 inches. The hot rolled material will then generally be subjected to a step of descaling 300 to remove oxidation and other surface impurities resulting from hot rolling. The descaled material will then generally be subjected to a step of cold rolling 400 to an intermediate thickness so as to avoid over hardening the material and making it too brittle for subsequent gasket processing. This step is generally followed by a step comprising an intermediate anneal 500 to remove a significant portion of the cold work imparted by cold rolling 400. The cold rolling 400 and intermediate anneal 500 are generally repeated at least once to obtain the desired gauge or starting thickness of the gasket sheet material. Once the desired gauge is achieved, the sheet material of the invention is subjected to cold rolling 600 to the desired gasket thickness, T. It is preferred that the amount of cold rolling 600 to T be about 10-70% reduction of original thickness of the annealed starting material, and more preferable that the amount of cold roll reduction be about 30-40% reduction of the original thickness. Accordingly, the step of deforming may include cold rolling 600 the annealed sheet to produce a cold-rolled microstructure having a degree of deformation that varies as a function of a percentage of cold reduction with the minimum and ranges described herein.

The method of the invention may optionally include a step of providing a precipitation hardening heat treatment 700, such that microstructure which is deformed by cold rolling 600 is also precipitation hardened. The deformed and precipitation hardened microstructure has a hardness which is greater than a hardness of said deformed microstructure for a given alloy. Precipitation hardening heat treatment may be performed at a temperature of between about 1200-1350° F.

The cold rolled iron-nickel-chromium alloy material, or alternately the cold rolled and precipitation hardened alloy material, is then subjected to the step of embossing 800 as described herein to form at least one embossment.

The method of the invention may also optionally include a step of: coating 900 the gasket with a heat resistant gasket coating to produce a coated gasket. The gasket coating (not shown) may include chemically exfoliated vermiculite where at least 90 weight percent of the vermiculite has a thickness of less than or equal to 30 microns and no dimension is greater than 1 millimeter; a high temperature organic resin that is heat resistant to at least 300 degrees Celsius; a supplementary inorganic resin; and a flaky filler, as described in U.S. Pat. No. 7,135,519. Surprisingly, this gasket coating material is also suitable for use over the higher operating temperature range of gaskets 10 of the invention.

The invention provides a sealing-enhancing coating for a gasket or a portion of a gasket, wherein the coating comprises flaky particles of chemically exfoliated vermiculite, at least 90% by weight of said particles having a thickness of no more than 30 microns, and no dimension greater than 1 mm, the particles forming 10 to 90 wt % of the coating, the coating also comprising 50 to 10 wt % of an organic polymer binder which is heat resistant to at least 300° C.

For the present purposes an organic polymer binder is considered to be heat resistant to a particular temperature if, when the binder is formed into a film 1 mm or less in thickness and heated to that temperature in free air for 24 hours, it either does not decompose or decomposes leaving a residue of at least 20% by weight of the film.

A coating of this type improves the sealing ability of embossed gaskets which experience high temperatures in service which exceed 1600° F., such as exhaust gaskets for internal combustion engines. Preferably a coating according to the invention has a thickness of less than 100 microns, more preferably less than 80 microns, and most preferably between 50 and 75 microns.

Obviously, many modifications and variations of the present invention are possible in light of the above teachings. It is, therefore, to be understood that within the scope of any ultimately allowed appended claims, the invention may be practiced otherwise than as specifically described.

What is claimed is:

1. A method of making an embossed metal gasket, comprising the steps of:
   forming an annealed sheet of an iron-nickel-chromium alloy;
   cold rolling the annealed sheet without shaping to produce a cold-rolled, work hardened microstructure of the sheet; and
   forming a gasket from said sheet including cold forming a least one embossed sealing bead which imparts further work hardening in the area of the at least one sealing bead wherein the at least one sealing bead is sealably operable with substantially full functional recovery in a fully-clamped, sealed joint at a temperature of greater than 1100° F. and up to 1200° F. without post-embossment heat treating of the sealing bead to provide the finished sealing bead with at least a portion of the work hardened microstructure as cold-rolled and embossed.

2. The method of claim 1, wherein the percentage of cold reduction from cold rolling ranges from 10-70%.

3. The method of claim 2, wherein the percentage of cold reduction ranges from 30-40%.

4. The method of claim 1, wherein the step of deforming produces a degree of deformation sufficient to provide said deformed sheet with a tensile elongation in a rolling direction of at least 5%.

5. The method of claim 4, wherein said step of deforming produces a degree of deformation sufficient to provide said deformed sheet with a tensile elongation in a rolling direction of about 5-10%.

6. The method of claim 1, further comprising a step of:
   providing a precipitation hardening heat treatment after the cold rolling step and before the cold forming of the at least one bead, wherein the deformed microstructure further comprises a deformed and precipitation hardened microstructure, wherein the deformed and precipitation hardened microstructure has a hardness which is greater than a hardness of the deformed microstructure.

7. The method of claim 6, wherein the precipitation hardening heat treatment is performed at a temperature of between about 1200-1350° F. for about 8-15 hours.

8. The method of claim 1, further comprising the step of:
   coating the gasket with a heat resistant coating.

9. The method of claim 8, wherein the heat resistant coating comprises:
   chemically exfoliated vermiculite wherein at least 90 weight percent of the vermiculite has a thickness of less than or equal to 30 microns and no dimension is greater than 1 millimeter;
   a high temperature organic resin that is heat resistant to at least 300 degrees Celsius;
   a supplementary inorganic resin; and
   a flaky filler.

* * * * *

UNITED STATES PATENT AND TRADEMARK OFFICE
CERTIFICATE OF CORRECTION

Page 1 of 3

PATENT NO.       : 8,177,929 B2
APPLICATION NO.  : 12/726591
DATED            : May 15, 2012
INVENTOR(S)      : Thomas Zurfluh It is certified that error appears in the above-identified patent and that said Letters Patent is hereby corrected as shown below:

IN THE DRAWINGS

In the drawings, Fig(s) 4-5 should be deleted and substitute therefore the attached figures 4-5 as shown on the attached sheets 3 and 4 of 6.

Signed and Sealed this
Eighteenth Day of December, 2012

David J. Kappos
*Director of the United States Patent and Trademark Office*